(12) United States Patent
Tanimura

(10) Patent No.: US 7,834,515 B2
(45) Date of Patent: Nov. 16, 2010

(54) DRIVE APPARATUS

(75) Inventor: Yasutaka Tanimura, Takatsuki (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 183 days.

(21) Appl. No.: 11/716,270

(22) Filed: Mar. 9, 2007

(65) Prior Publication Data

US 2007/0247023 A1 Oct. 25, 2007

(30) Foreign Application Priority Data

Mar. 13, 2006 (JP) .......................... JP2006-067358

(51) Int. Cl.
*H02N 2/06* (2006.01)
(52) U.S. Cl. ...................................... 310/317
(58) Field of Classification Search ................. 310/314, 310/316.01–316.03, 317, 319, 323.01–323.21
See application file for complete search history.

(56) References Cited

U.S. PATENT DOCUMENTS 5,917,267 A * 6/1999 Miyazawa et al. .......... 310/317

2001/0026112 A1* 10/2001 Yoshida et al. ............. 310/328
2005/0067921 A1* 3/2005 Yamamoto .................. 310/317
2006/0082253 A1* 4/2006 Hara .......................... 310/317

FOREIGN PATENT DOCUMENTS

JP 63-7174 A 1/1988
JP 9-163765 A 6/1997

OTHER PUBLICATIONS

Translation of JP 63-007174.*

* cited by examiner

*Primary Examiner*—Walter Benson
*Assistant Examiner*—Derek J Rosenau
(74) *Attorney, Agent, or Firm*—Sidley Austin LLP

(57) ABSTRACT

A drive apparatus includes an ultrasonic motor that rotates by an electromechanical transducer element, and generates an intermittent signal that outputs an alternating signal without change only during ON times of a pulse signal as a driving signal for the ultrasonic motor. A voltage is applied to the ultrasonic motor based on the driving signal to intermittently drive the ultrasonic motor, thereby reducing (adjusting) the speed of the ultrasonic motor. By setting the frequency of the intermittent signal (the inverse of a period of the intermittent signal) to a frequency outside the audible frequency range during the intermittent drive, noise can be easily lowered.

17 Claims, 16 Drawing Sheets

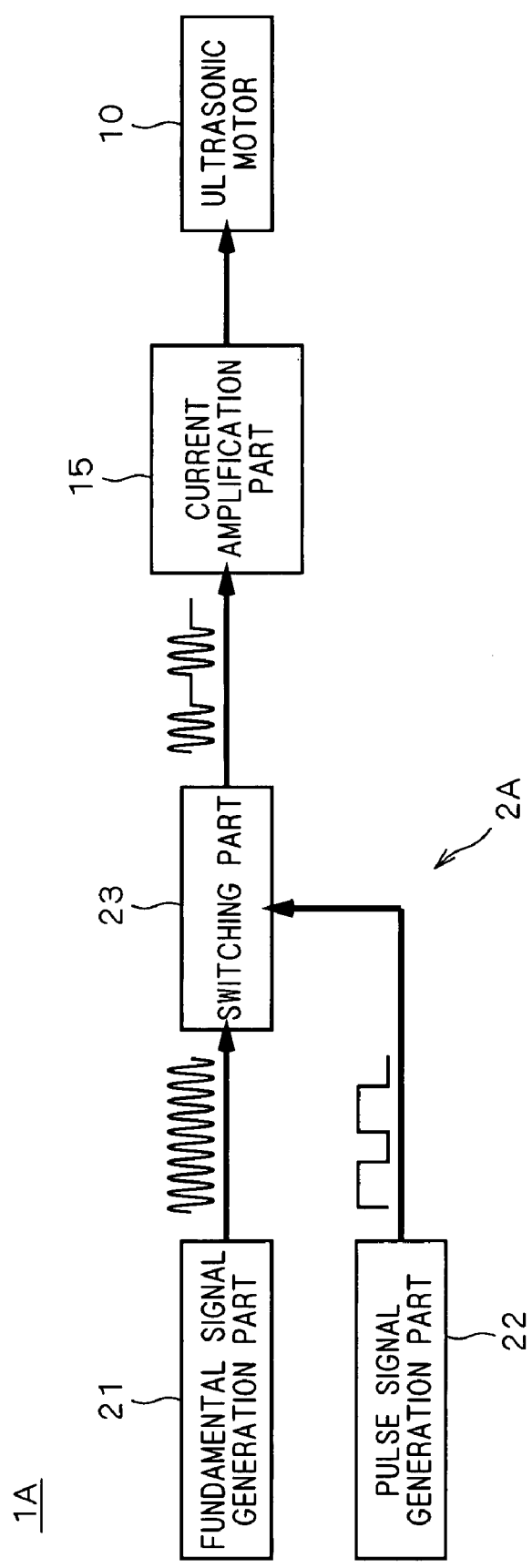

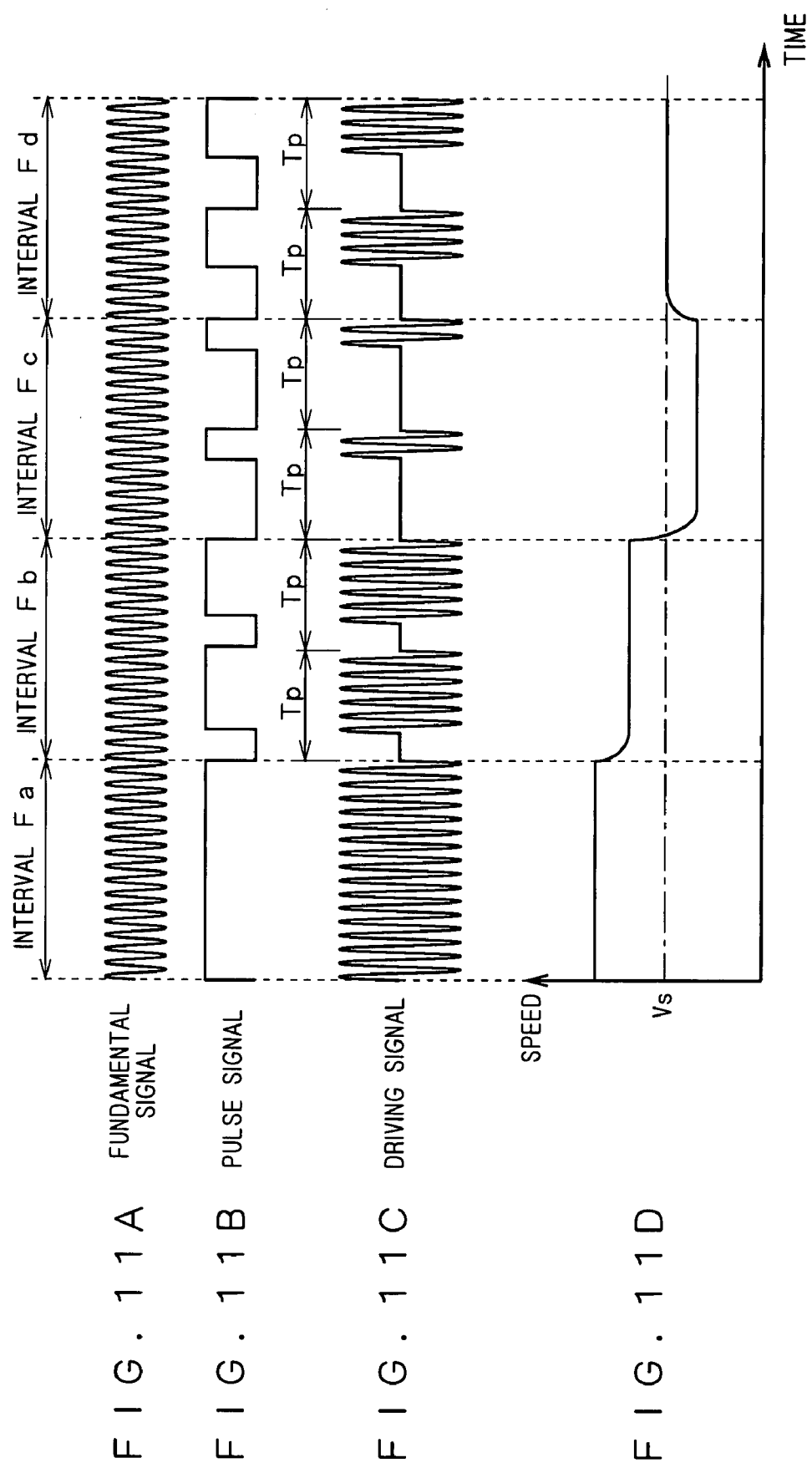

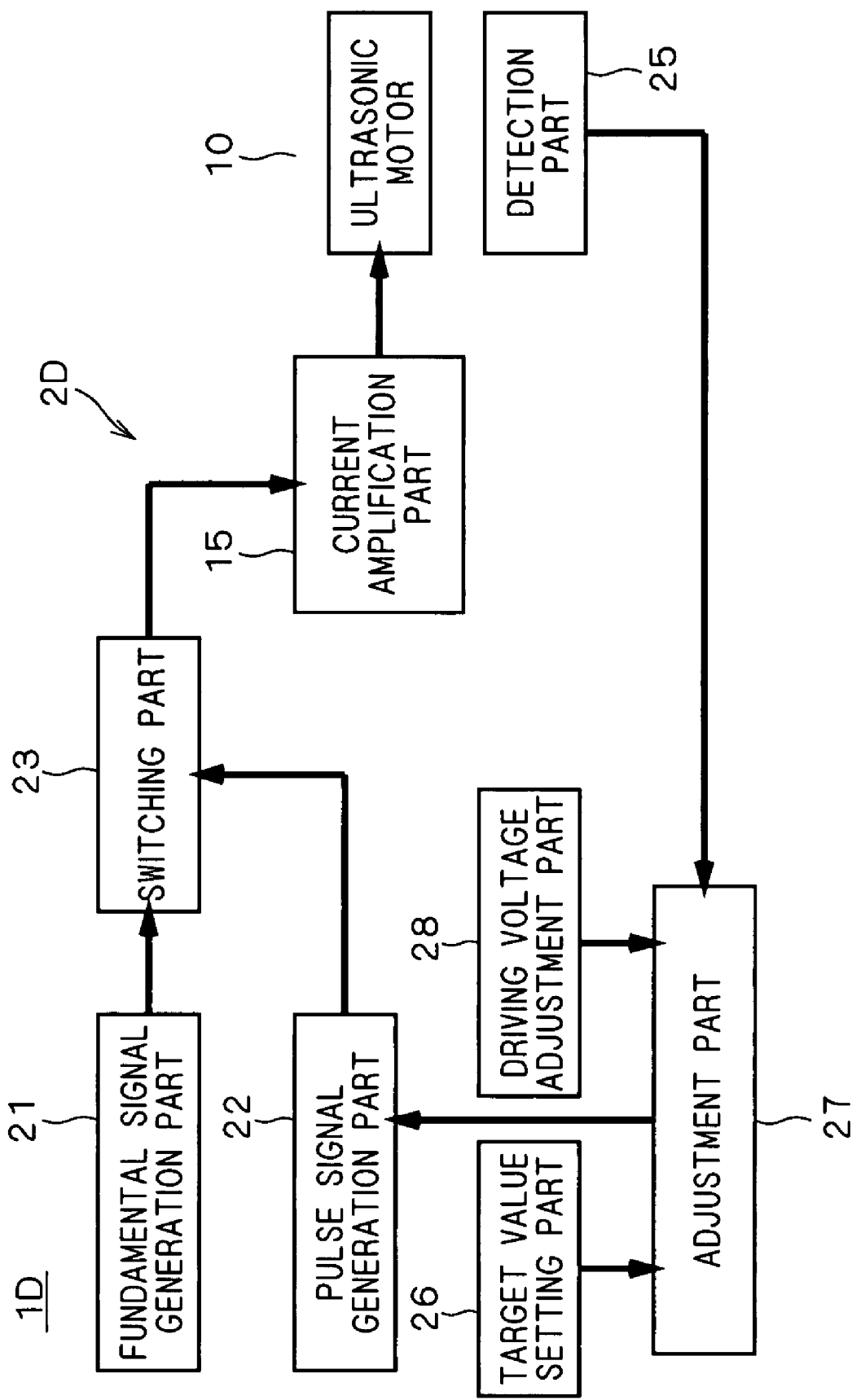

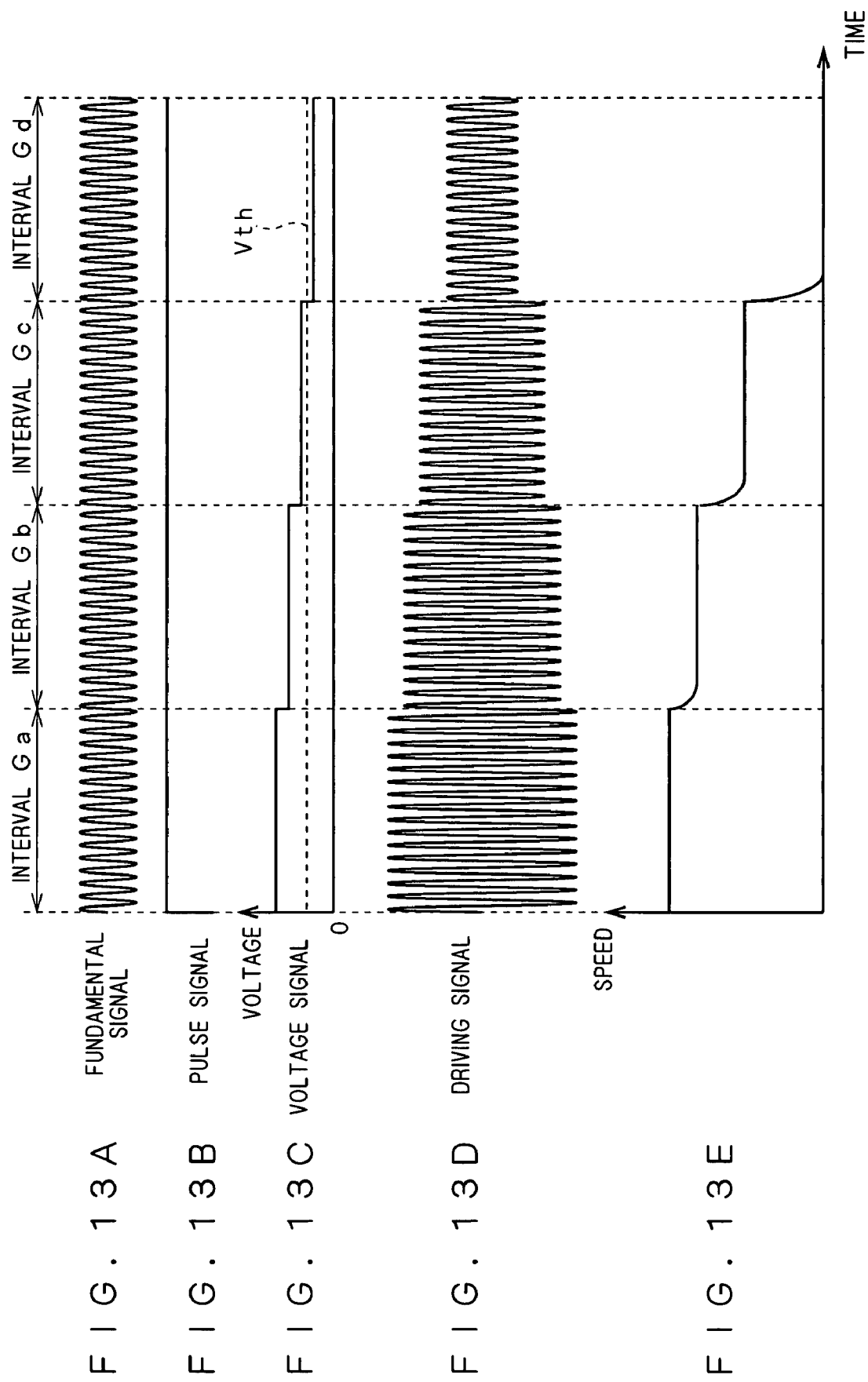

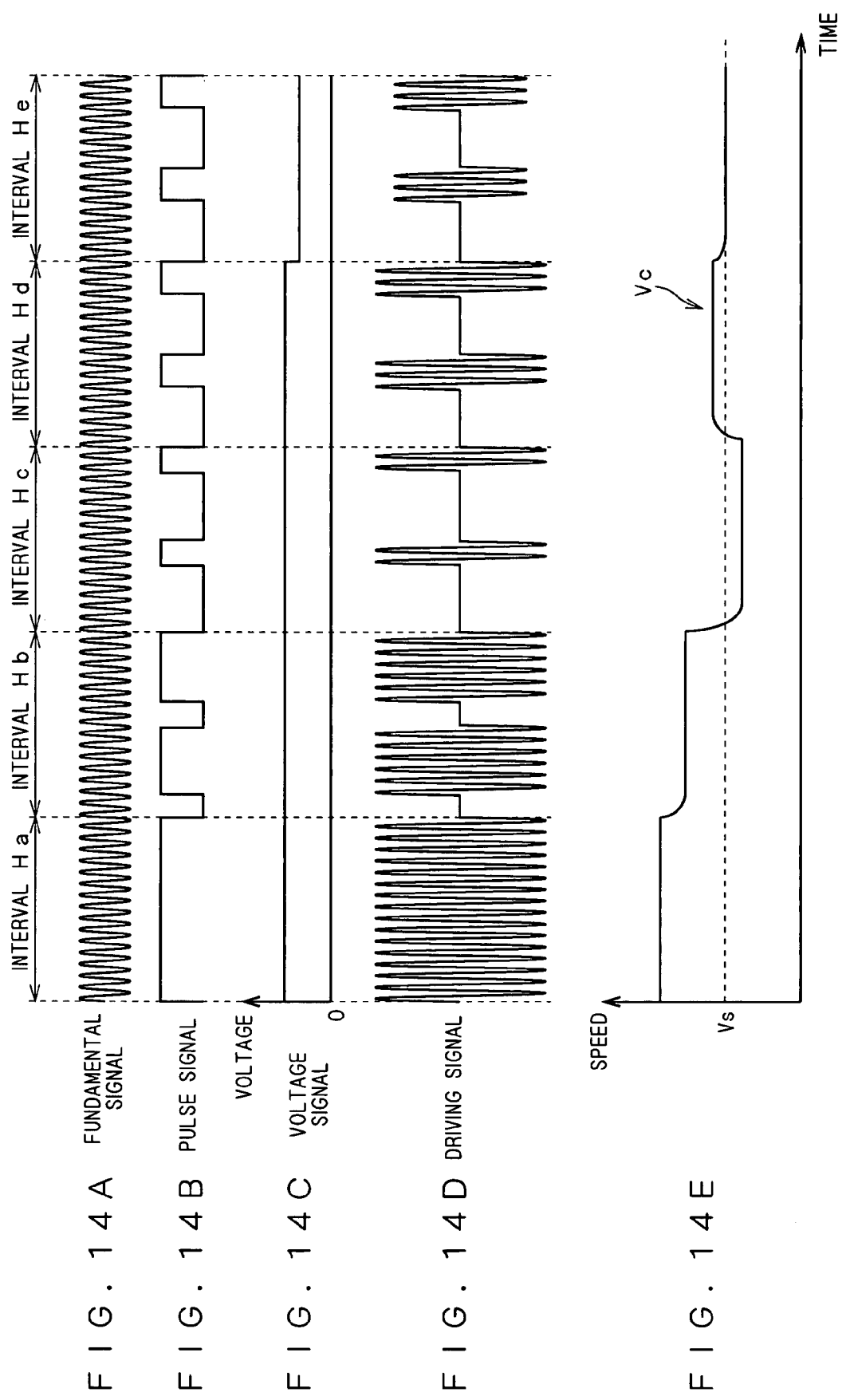

F I G. 15A
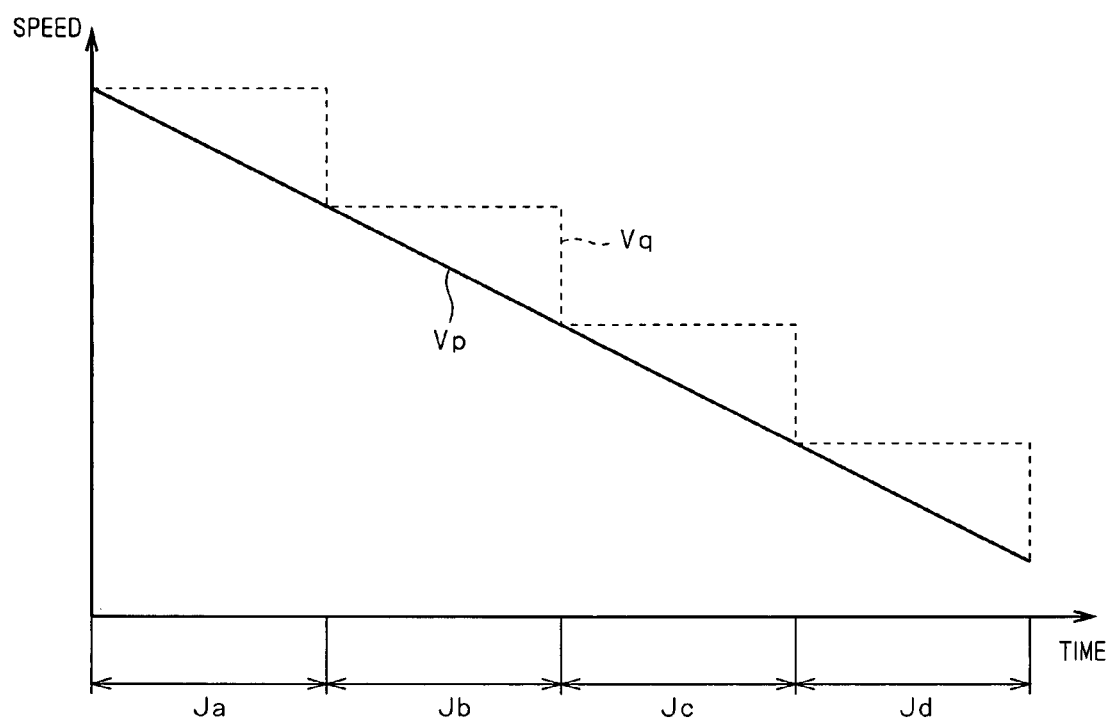
F I G. 15B
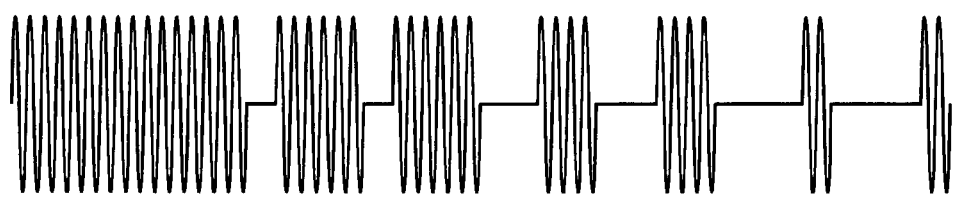
F I G. 15C
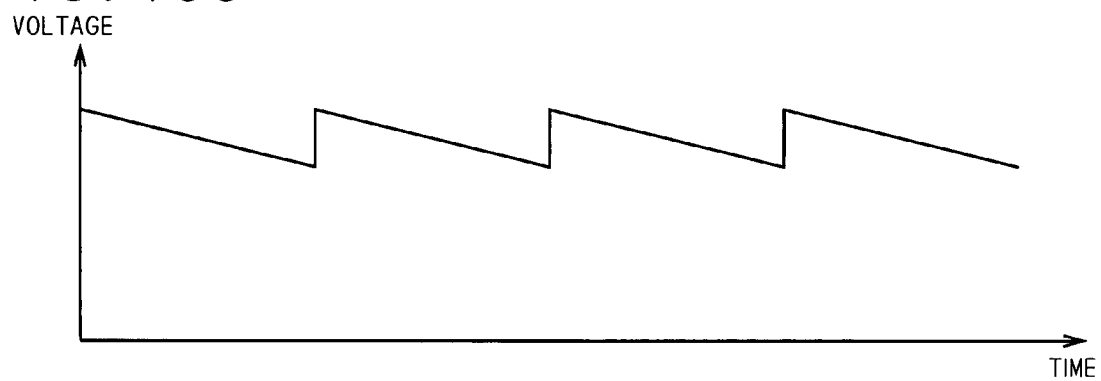

DRIVE APPARATUS

This application is based on application No. 2006-067358 filed in Japan, the contents of which are hereby incorporated by reference.

BACKGROUND OF THE INVENTION

1. Field of the Invention

The present invention relates to a drive apparatus that drives movable parts.

2. Description of the Background Art

Driving speed of an ultrasonic motor having a piezoelectric element (electromechanical transducer element) may be adjusted by performing intermittent drive that repeats output and suspension of a driving signal (e.g. Japanese Patent Application Laid-Open No. 63-7174 (1988)).

However, such intermittent drive causes audible sound to be generated during intervals between the time of starting drive by outputting the driving signal and the time of suspending drive by suspending the driving signal.

A technique for solving this problem is disclosed in Japanese Patent Application Laid-Open No. 9-163765 (1997), for example. The technique aims to lower noise by controlling the voltage of the driving signal at the times of starting and suspending drive.

Unfortunately, it is required of the technique disclosed in the above JP 9-163765 to perform special voltage control on the driving signal each time the driving signal is switched to be output and suspended in a high-speed cycle, which requires a complicated configuration.

SUMMARY OF THE INVENTION

The present invention is directed to a drive apparatus for driving a movable part.

In an aspect of the invention, the drive apparatus includes: (a) an electromechanical transducer element which expands and contracts upon application of a voltage to drive the movable part; (b) an intermittent outputting part which intermittently outputs a periodic signal; and (c) an intermittent driving part which applies a voltage to the electromechanical transducer element based on an intermittent signal output from the intermittent outputting part, the intermittent driving part being capable of adjusting a driving speed of the movable part, and a frequency of an intermittent period of the intermittent signal being a frequency outside an audible frequency range. Accordingly, noise can be easily lowered at the time of intermittently driving the electromechanical transducer element.

In another aspect of the invention, the intermittent outputting part repeats an output cycle consisting of an output period during which the periodic signal is output and a suspension period during which an output of the periodic signal is suspended, the intermittent outputting part including (b-1) a changing part which changes a ratio of the output period to the suspension period in the output cycle without changing a period of the output cycle, the changing part changing the driving speed of the movable part. Accordingly, the driving speed of the movable part can be easily changed.

Therefore, it is an object of the present invention to provide a drive apparatus capable of lowering noise easily at the time of intermittently driving an electromechanical transducer element.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram of the configuration of a principal part of a drive apparatus according to a first preferred embodiment of the present invention;

FIGS. 11A to 11D illustrate the operation of a driving signal generation unit;

FIG. 12 is a block diagram of the configuration of a principal part of a drive apparatus according to a fourth preferred embodiment of the present invention;

FIGS. 13A to 13E illustrate a speed adjustment to the ultrasonic motor by a driving voltage adjustment part;

FIGS. 14A to 14E illustrate a speed adjustment to the ultrasonic motor by the drive apparatus of FIG. 12;

FIGS. 15A to 15C illustrate a speed adjustment to the ultrasonic motor by hybrid control combining intermittent drive control and driving voltage control;

DESCRIPTION OF THE PREFERRED EMBODIMENTS

First Preferred Embodiment

<Configuration of Drive Apparatus>

FIG. 1 is a block diagram of the configuration of a principal part of a drive apparatus 1A according to a first preferred embodiment of the present invention.

The drive apparatus 1A includes an ultrasonic motor 10, a driving signal generation unit 2A that generates a driving signal for driving the ultrasonic motor 10, and a current amplification part 15 that amplifies current on the driving signal (voltage signal) output from the driving signal generation unit 2A and applies a voltage to (a piezoelectric element of) the ultrasonic motor 10.

Figure 10B:
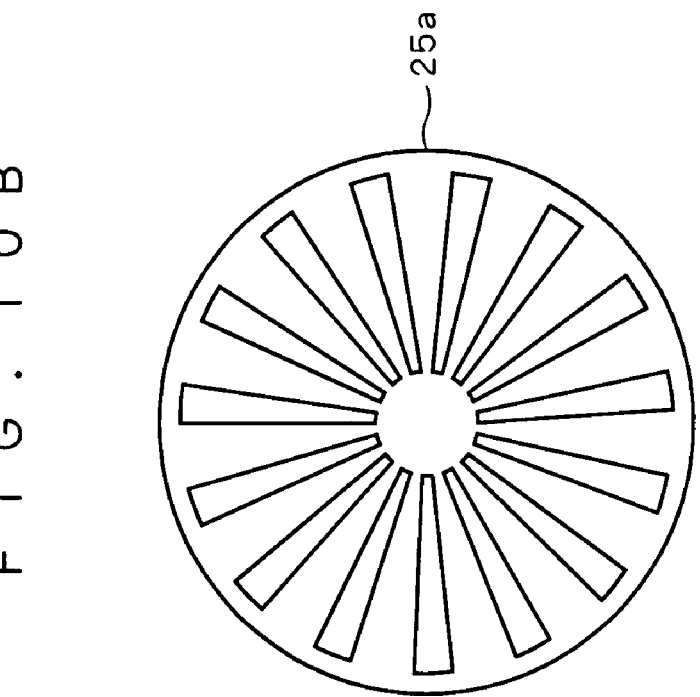
FIGS. 10A and 10B show a specific configuration of a detection part.
Figure 10A:
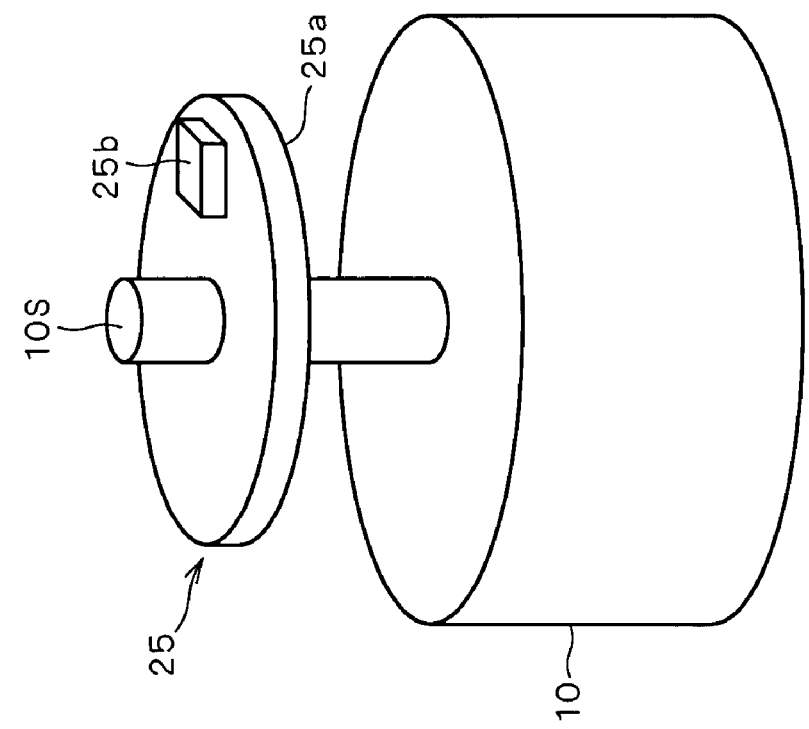

The ultrasonic motor 10 includes a piezoelectric element that expands and contracts upon application of a voltage (e.g. a piezoelectric element 255 in FIG. 19), and is formed as a rotatable actuator having a rotor (movable part) that rotates by the expanding and contracting operation of the piezoelectric element (see FIG. 10A).

The driving signal generation unit 2A includes a fundamental signal generation part 21, a pulse signal generation part 22, and a switching part 23.

Figure 2A:
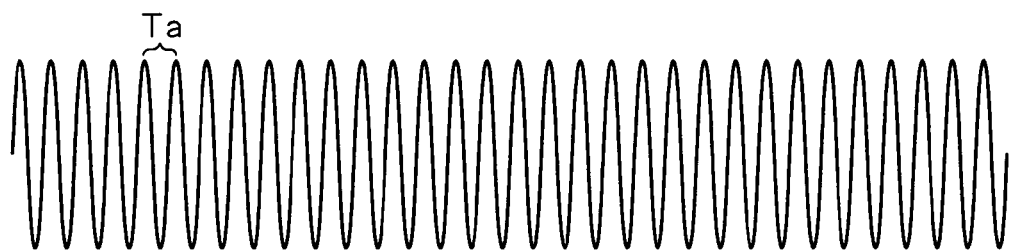
FIGS. 2A to 2C illustrate the generation of a driving signal at a driving signal generation unit.

The fundamental signal generation part 21 is formed as an oscillator, and outputs an alternating signal of constant amplitude (periodic signal of a period Ta) such as is shown in FIG. 2A as a fundamental signal. The fundamental signal generation part 21 is not required to be formed as an oscillator, but may be formed as a voltage/frequency converter, or a signal generator that generates an alternating voltage to an input signal.

Figure 2B:
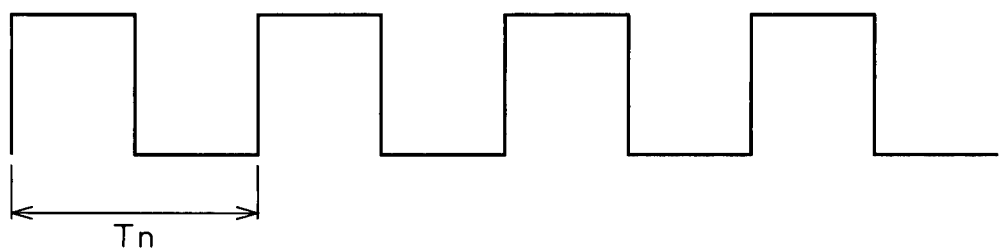

The pulse signal generation part 22 is formed as a rectangular wave periodic signal generator that generates a pulse signal (rectangular wave periodic signal) having a prescribed period Tn such as is shown in FIG. 2B, which is longer than the period Ta of the fundamental signal (FIG. 2A), and a changeable duty ratio (=ON time/period Tn). The pulse signal generation part 22 is not required to be formed as the rectangular wave periodic signal generator described above, but may be formed as a signal generator that periodically outputs a pulse signal (rectangular wave signal) based on information about predetermined ON times and OFF times.

The switching part 23 outputs the fundamental wave from the fundamental signal generation part 21 without change only during ON times of the pulse signal output from the pulse signal generation part 22. Namely, the switching part 23 repeats an output cycle consisting of an output period during which the periodic signal is output from the fundamental signal generation part 21 and a suspension period during which the output is suspended, based on the pulse signal from the pulse signal generation part 22. With the switching part 23 intermittently outputting the fundamental signal (periodic signal) in this manner, the fundamental signal (FIG. 2A) is intermittently output as an intermittent signal (FIG. 2C) based on the pulse signal (FIG. 2B).

Figure 2C:
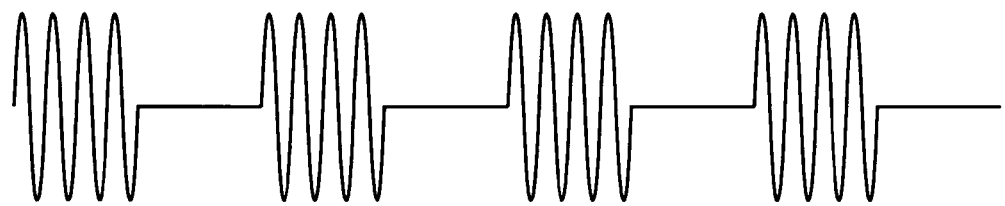
Figure 3:
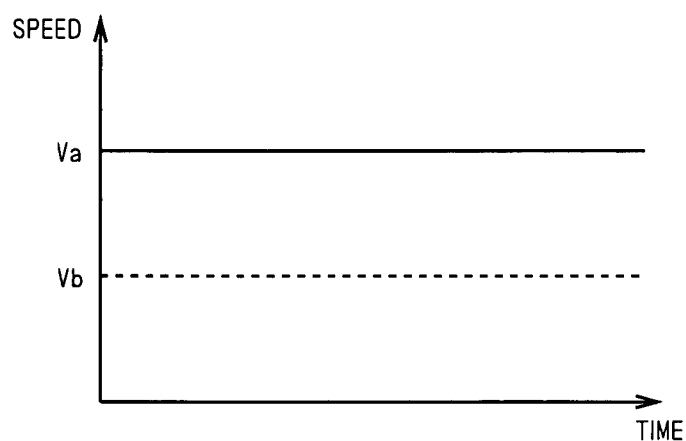
FIG. 3 illustrates reducing a speed of an ultrasonic motor by intermittent drive.

Referring to FIG. 3, the driving signal generation unit 2A having the above configuration can reduce a speed Va of the ultrasonic motor 10 when a driving signal (fundamental signal without change) such as is shown in FIG. 2A is output by setting the duty ratio to 100% at the pulse signal generation part 22, down to a speed Vb when a driving signal such as is shown in FIG. 2C is output by setting the duty ratio to about 50% at the pulse signal generation part 22. That is, by controlling the duty ratio of the pulse signal generated at the pulse signal generation part 22, the ultrasonic motor 10 can be intermittently driven in various ways, which allows the rotation speed of the ultrasonic motor 10 (driving speed of the rotor) to be adjusted.

Then, at the pulse signal generation part 22, the frequency of a pulse signal (the inverse of the period Tn (FIG. 2B)) corresponding to the frequency of an intermittent period of the intermittent signal output from the driving signal generation unit 2A is set to about 20 kHz or higher, which is the upper limit of the audible frequency range. Because the upper limit frequency of the audible range varies between individuals, the upper limit frequency may be set correspondingly to the audible range of each person. Harsh sounds generated at the time of intermittently driving the ultrasonic motor 10 can therefore be prevented.

That is, the drive apparatus 1A sets an intermittent frequency corresponding to the inverse of a period of an intermittent signal to a frequency outside the audible frequency range at the time of intermittently driving the ultrasonic motor 10, thereby easily suppressing harsh sounds to lower noise.

The drive apparatus 1A is not required to use an alternating signal as a fundamental signal, but may use a rectangular wave signal or a triangular wave signal described below as a fundamental signal.

Figure 4:
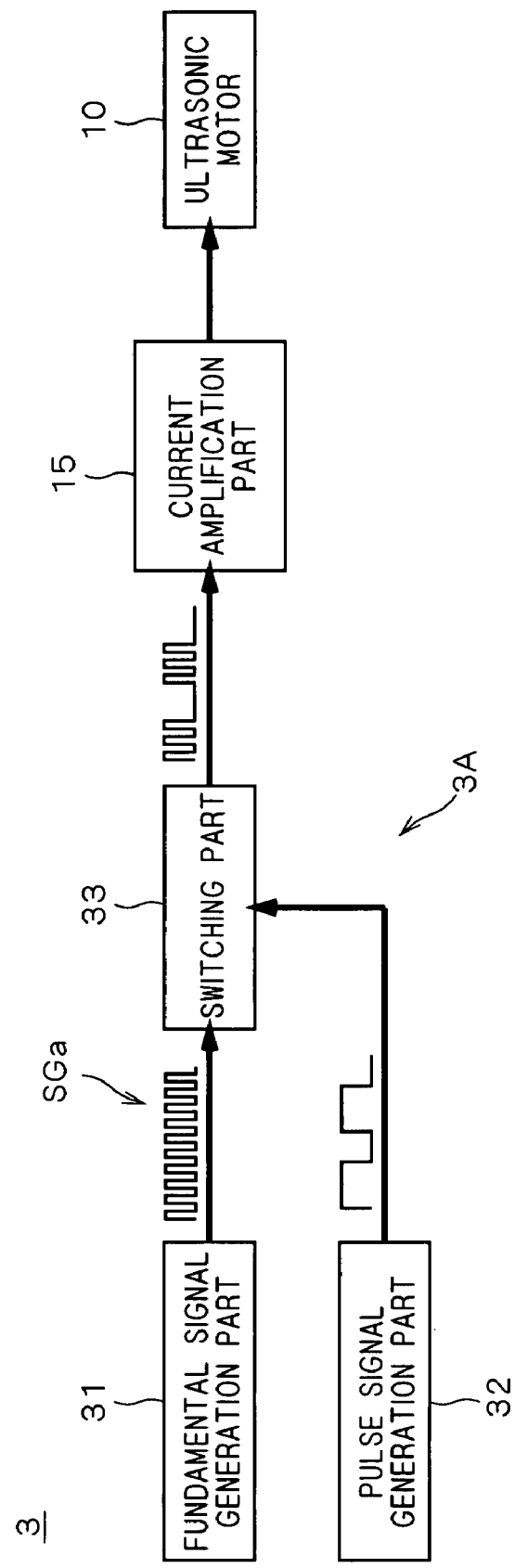
FIG. 4 is a block diagram of the configuration of a principal part of a drive apparatus using a rectangular wave signal as a fundamental signal.

FIG. 4 is a block diagram of the configuration of a principal part of a drive apparatus 3 using a rectangular wave signal as a fundamental signal.

The drive apparatus 3 includes the ultrasonic motor 10 and the current amplification part 15 each having the same configuration as its corresponding part in the drive apparatus 1A, and a driving signal generation unit 3A having a similar configuration to the driving signal generation unit 2A.

The driving signal generation unit 3A includes a pulse signal generation part 32 and a switching part 33 each having the same configuration as its corresponding part in the drive apparatus 1A, and a fundamental signal generation part 31 having a different configuration from its corresponding part in the drive apparatus 1A.

The fundamental signal generation part 31 is formed as a PWM (Pulse Width Modulation) circuit, and outputs a rectangular wave signal SGa as a fundamental signal (periodic signal). The fundamental signal generation part 31 is not required to be formed as a PWM circuit, but may be formed as a rectangular wave signal generator that periodically outputs a rectangular wave based on predetermined ON times and OFF times, or a rectangular wave signal generator that periodically outputs a rectangular wave based on a predetermined period time and duty ratio.

Again in the drive apparatus 3 having this configuration, by setting the frequency of a pulse signal generated at the pulse signal generation part 32 to a frequency outside the audible frequency range at the time of intermittently driving the ultrasonic motor 10, harsh sounds can be easily suppressed to lower noise, as in the drive apparatus 1A.

Figure 5:
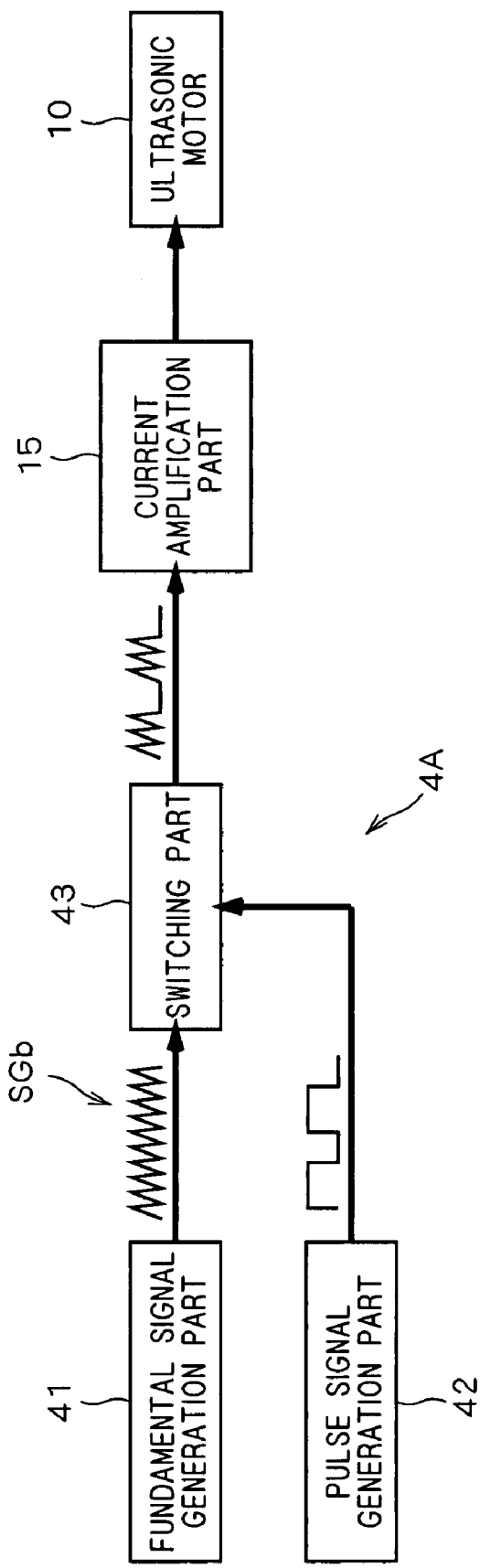
FIG. 5 is a block diagram of the configuration of a principal part of a drive apparatus using a triangular wave signal as a fundamental signal.

FIG. 5 is a block diagram of the configuration of a principal part of a drive apparatus 4 using a triangular wave signal as a fundamental signal.

The drive apparatus 4 includes the ultrasonic motor 10 and the current amplification part 15 each having the same configuration as its corresponding part in the drive apparatus 1A, and a driving signal generation unit 4A having a similar configuration to the driving signal generation unit 2A.

The driving signal generation unit 4A includes a pulse signal generation part 42 and a switching part 43 each having the same configuration as its corresponding part in the drive apparatus 1A, and a fundamental signal generation part 41 having a different configuration from its corresponding part in the drive apparatus 1A.

The fundamental signal generation part 41 is formed as a triangular wave generation circuit that periodically outputs a triangular wave (sawtooth wave) signal SGb as a fundamental signal (periodic signal). The fundamental signal generation part 41 is not required to be formed as a triangular wave generation circuit, but may be formed as a pseudo triangular wave generation circuit that periodically outputs a stepped pseudo triangular wave.

Again in the drive apparatus 4 having this configuration, by setting the frequency of a pulse signal generated at the pulse signal generation part 42 to a frequency outside the audible frequency range at the time of intermittently driving the ultrasonic motor 10, harsh sounds can be easily suppressed to lower noise, as in the drive apparatus 1A.

Second Preferred Embodiment

Figure 6:
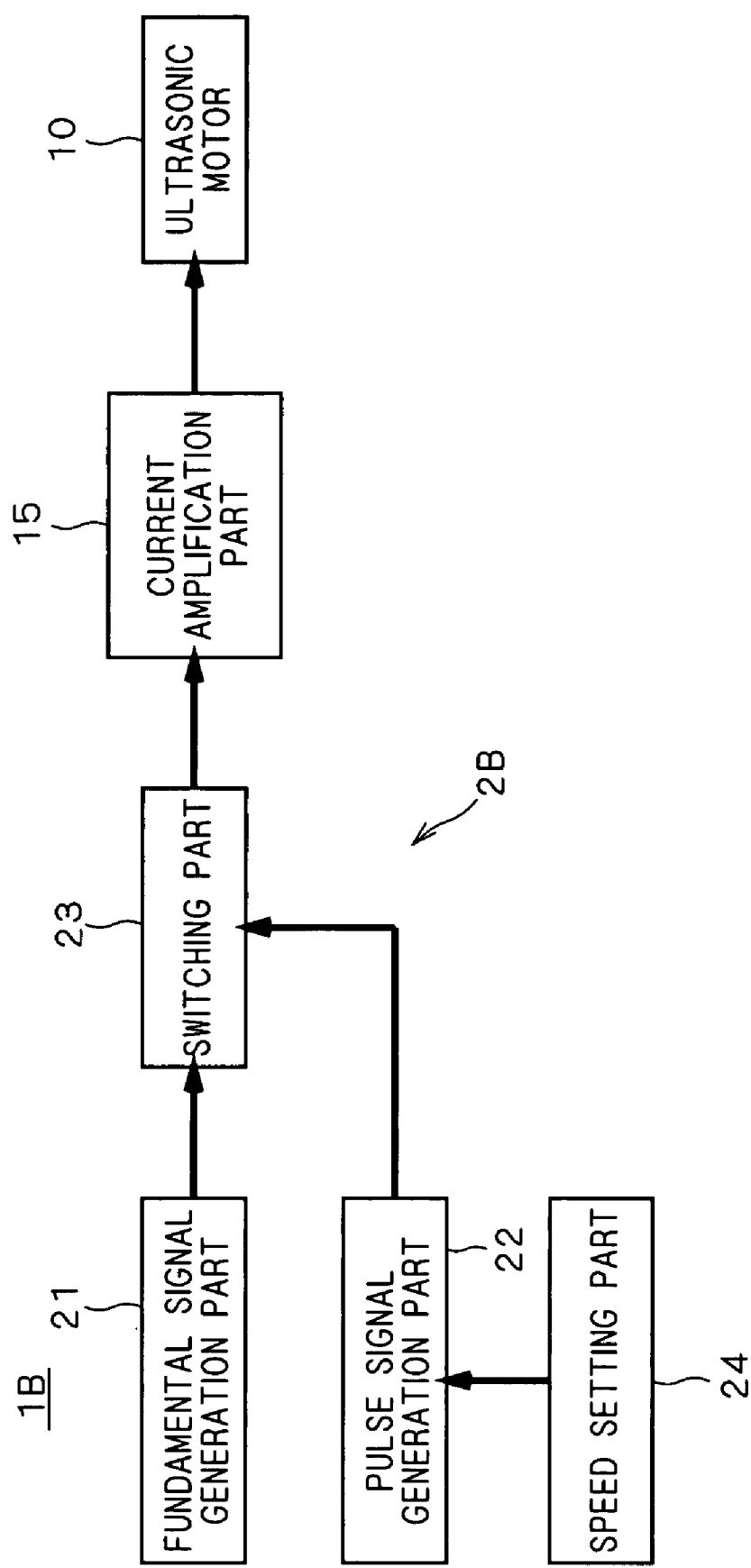
FIG. 6 is a block diagram of the configuration of a principal part of a drive apparatus according to a second preferred embodiment of the present invention.

FIG. 6 is a block diagram of the configuration of a principal part of a drive apparatus 1B according to a second preferred embodiment of the present invention.

The drive apparatus 1B has a similar configuration to the drive apparatus 1A according to the first preferred embodiment, except a driving signal generation unit.

Namely, a driving signal generation unit 2B of the drive apparatus 1B includes the fundamental signal generation part 21, the pulse signal generation part 22, and the switching part 23 in the first preferred embodiment, and additionally includes a speed setting part 24.

The speed setting part 24 is capable of setting the speed of the ultrasonic motor 10, and sends information on the set speed to the pulse signal generation part 22. Upon receipt of the speed information from the speed setting part 24, the pulse signal generation part 22 generates a pulse signal having a duty ratio in accordance with the set speed at the speed setting part 24.

Figure 7:
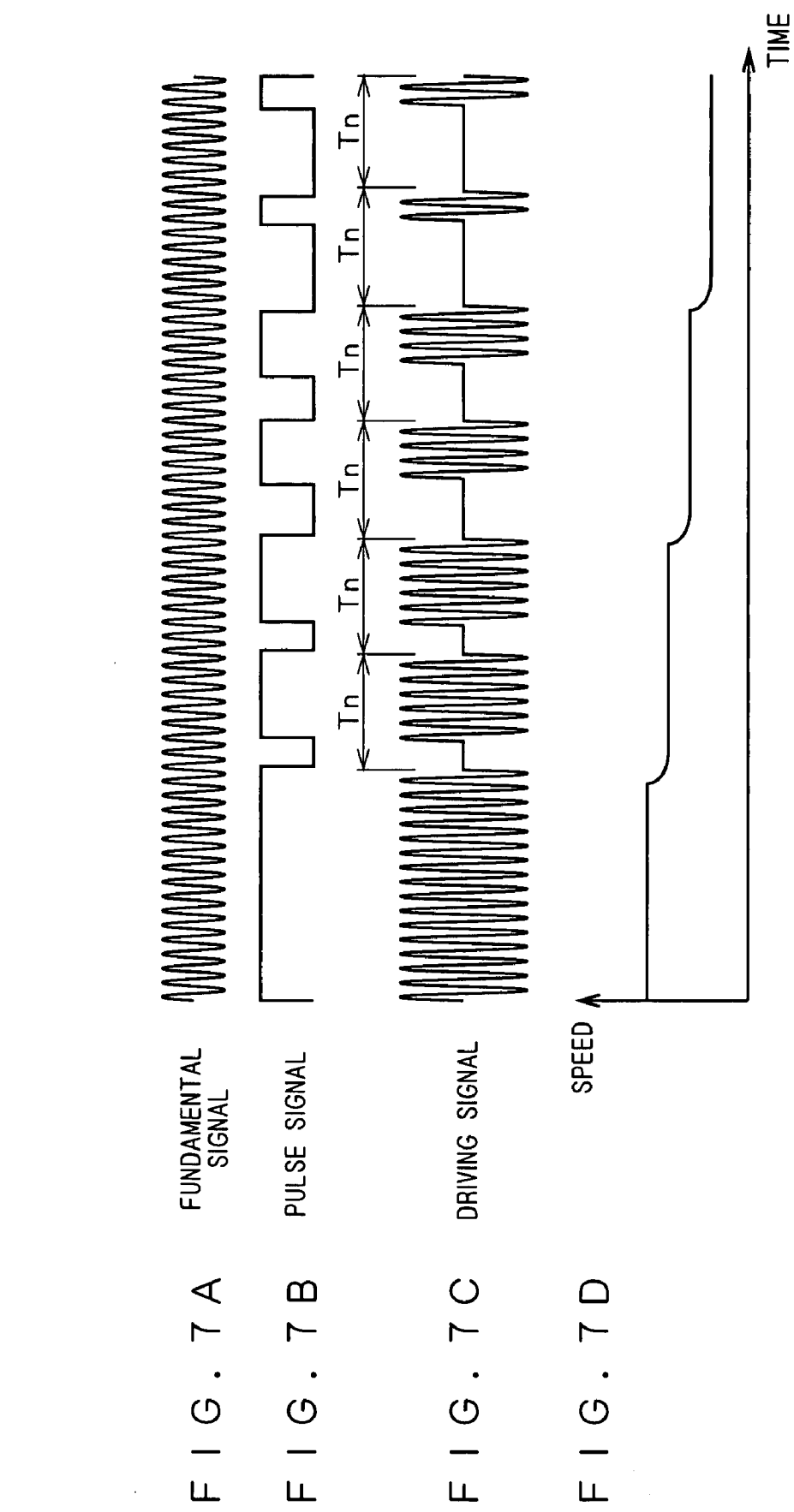
FIGS. 7A to 7D illustrate a speed adjustment to the ultrasonic motor by changing the duty ratio of a pulse signal.

In the driving signal generation unit 2B having this configuration, the pulse signal generation part 22 generates a pulse signal (FIG. 7B) having a changed duty ratio within a single period Tn in accordance with the set speed at the speed setting part 24, so that a fundamental signal (FIG. 7A) input to the switching part 23 is output as a driving signal (FIG. 7C) having an intermittent signal. That is, the driving signal generation unit 2B changes the ratio (duty ratio) of an output period to a suspension period of the fundamental signal (periodic signal) in an output cycle of the intermittent signal from the switching part 23 based on the set speed at the speed setting part 24, without changing the period of the output cycle. The driving signal (intermittent signal) thus generated at the driving signal generation unit 2B is then input to the ultrasonic motor 10 through the current amplification part 15, thereby gradually changing the speed of the ultrasonic motor 10, as shown in FIG. 7D. Namely, by setting the speed of the ultrasonic motor 10 to be gradually reduced at the speed setting part 24, the duty ratio of the pulse signal generated at the pulse signal generation part 22 is gradually reduced as shown in FIG. 7B, causing the speed of the ultrasonic motor 10 to follow the set speed at the speed setting part 24 and be gradually reduced as shown in FIG. 7D.

Again in the drive apparatus 1B provided with the speed setting part 24 capable of setting the speed of the ultrasonic motor 10, by setting the frequency of a pulse signal generated at the pulse signal generation part 22 to a frequency outside the audible frequency range at the time of intermittently driving the ultrasonic motor 10, harsh sounds can be easily suppressed to lower noise, as in the first preferred embodiment.

Figure 8:
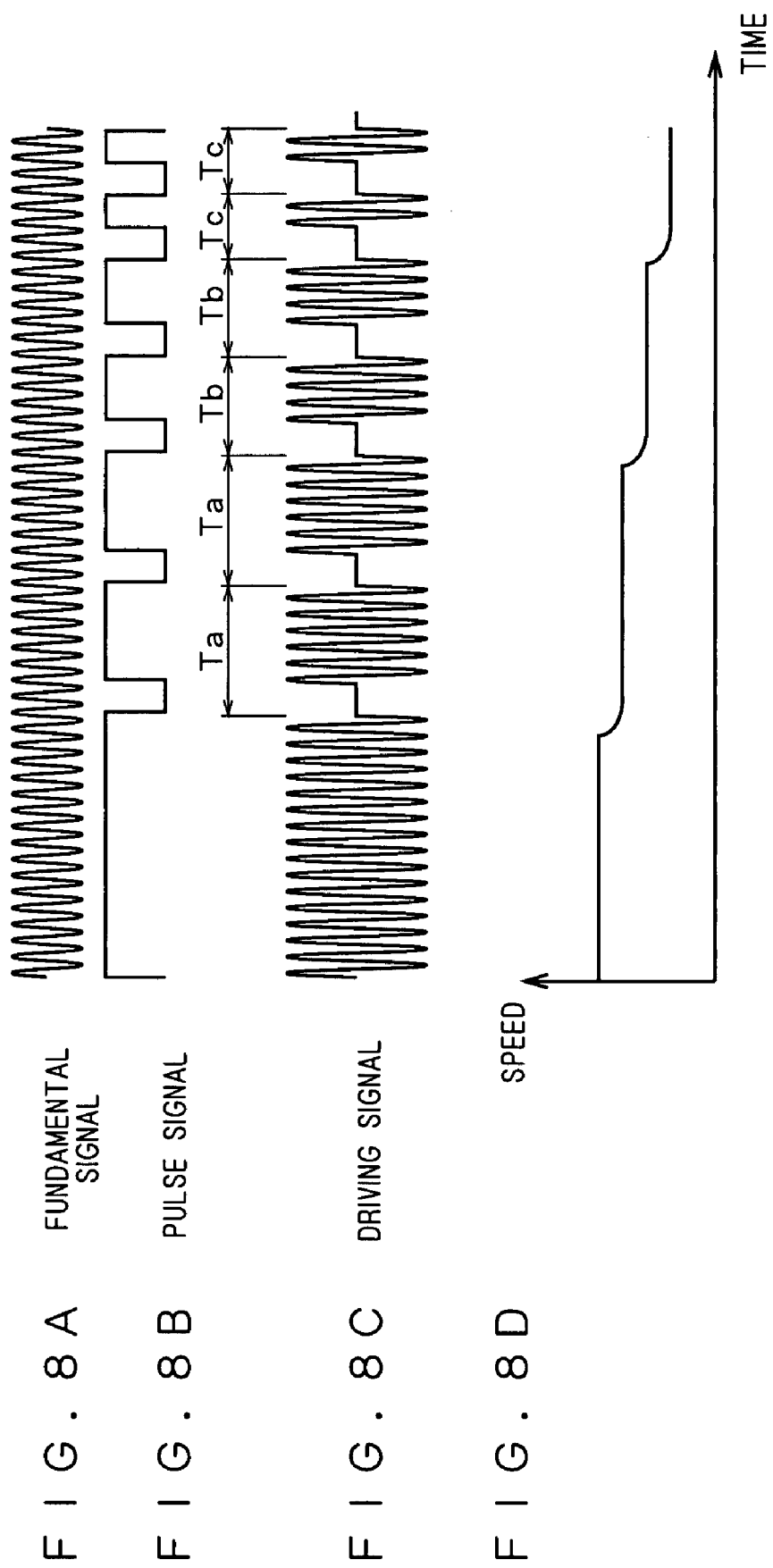
FIGS. 8A to 8D illustrate a speed adjustment to the ultrasonic motor by changing the period of a pulse signal.

The speed adjustment to the ultrasonic motor 10 in the drive apparatus 1B is not required to be made by changing the duty ratio of a pulse signal at the pulse signal generation part 22, but may be made by changing the period of a pulse signal, as shown in FIG. 8B.

More specifically, the pulse signal generation part 22 generates a pulse signal (FIG. 8B) having a changed pulse period by changing the ON time of the pulse signal in accordance with the set speed at the speed setting part 24 while fixing the OFF time. As a result, a fundamental signal (FIG. 8A) input to the switching part 23 is output as a driving signal (FIG. 8C) having an intermittent signal. That is, the driving signal generation unit 2B relatively changes the ratio of an output period to a suspension period of the fundamental signal (periodic signal) in an output cycle, by changing the period of the output cycle of the intermittent signal from the switching part 23 based on the set speed at the speed setting part 24. The change in ratio of an output period to a suspension period of the fundamental signal (periodic signal) is shown by Ta, Tb and Tc in FIG. 8C. The driving signal (intermittent signal) thus generated at the driving signal generation unit 2B is then input to the ultrasonic motor 10 through the current amplification part 15, thereby gradually changing the speed of the ultrasonic motor 10, as shown in FIG. 8D. Namely, by setting the speed of the ultrasonic motor 10 to be gradually reduced at the speed setting part 24, the ratio of ON time to OFF time of the pulse signal generated at the pulse signal generation part 22 as shown in FIG. 8B is gradually reduced, causing the speed of the ultrasonic motor 10 to follow the set speed at the speed setting part 24 and be gradually reduced as shown in FIG. 8D.

Third Preferred Embodiment

Figure 9:
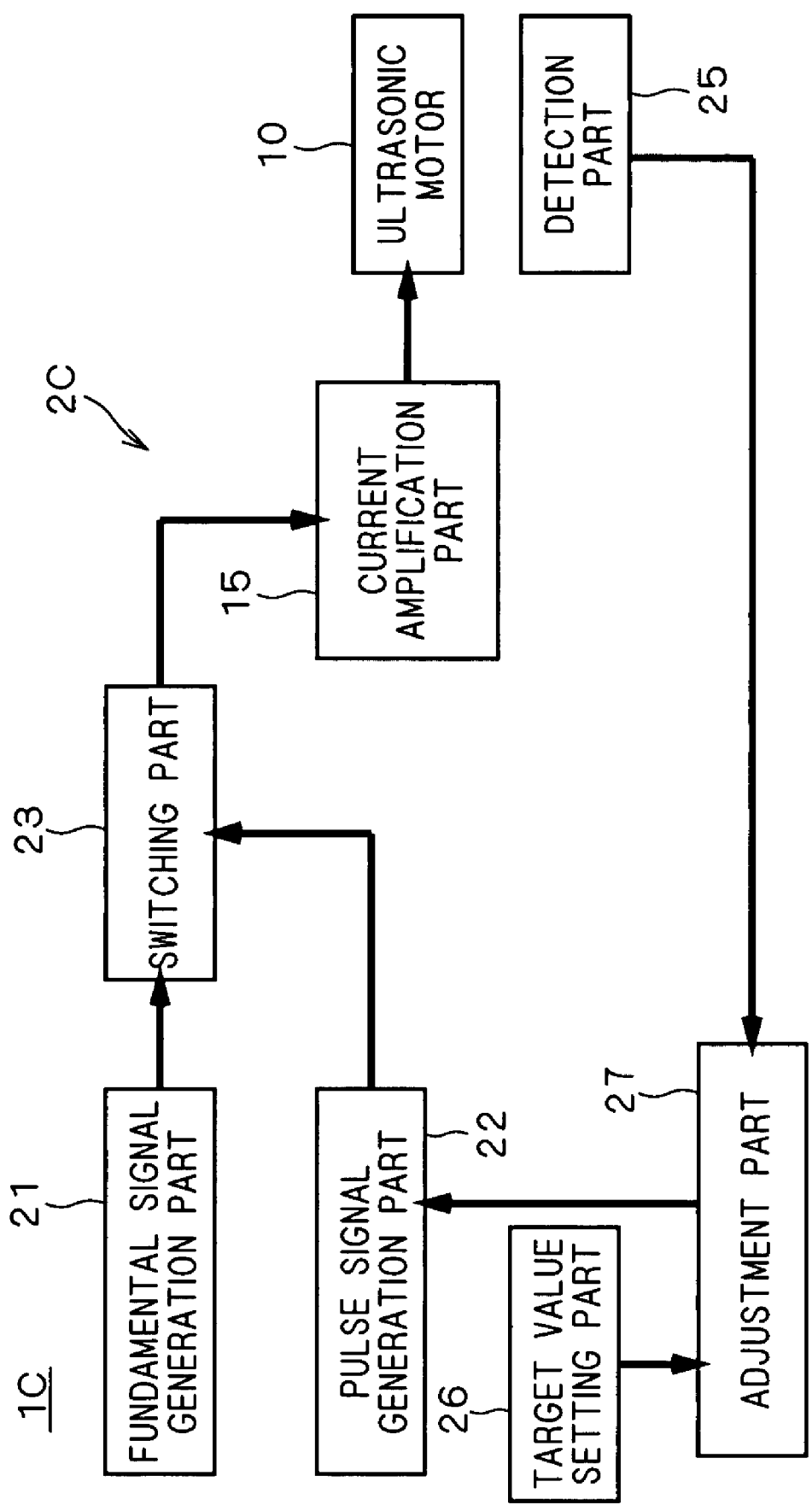
FIG. 9 is a block diagram of the configuration of a principal part of a drive apparatus according to a third preferred embodiment of the present invention.

FIG. 9 is a block diagram of the configuration of a principal part of a drive apparatus 1C according to a third preferred embodiment of the present invention.

The drive apparatus 1C has a similar configuration to the drive apparatus 1A according to the first preferred embodiment, except a driving signal generation unit.

Namely, a driving signal generation unit 2C of the drive apparatus 1C includes the fundamental signal generation part 21, the pulse signal generation part 22, and the switching part 23 in the first preferred embodiment, and additionally includes a detection part 25, a target value setting part 26, and an adjustment part 27.

The detection part 25 is formed as an optical encoder such as is shown in FIG. 10A, and outputs a detection signal for the speed of the ultrasonic motor 10 (driving speed of a rotor). In the detection part 25, an encoder 25b detects variations in encoder pattern during rotation of an encoder plate 25a (FIG. 10B) fixed to a rotor 10s of the ultrasonic motor 10, to detect the rotation speed of the ultrasonic motor 10.

The target value setting part 26 sets a target value for the speed of the ultrasonic motor 10 in accordance with the value detected at the detection part 25.

The adjustment part 27 outputs an adjustment signal to the pulse signal generation part 22, the adjustment signal being in accordance with deviation between the speed detected at the detection part 25 and the target value set at the target value setting part 26. More specifically, the adjustment part 27 outputs the following adjustment signals:

(1) Detected Speed>Target Value:

An adjustment signal is output that reduces the duty ratio of a pulse signal generated at the pulse signal generation part 22.

(2) Detected Speed<Target Value:

An adjustment signal is output that increases the duty ratio of a pulse signal generated at the pulse signal generation part 22.

(3) Detected Speed=Target Value:

An adjustment signal is output that maintains the duty ratio of a pulse signal generated at the pulse signal generation part 22.

As described above, the driving signal generation unit 2C changes the ratio (duty ratio) of an output period to a suspension period of a fundamental signal (periodic signal) for an intermittent signal output from the switching part 23, based on the speed (detected signal) detected at the detection part 25 and the target value for the speed. This operation will more specifically be described with reference to FIG. 11.

The driving signal generation unit 2C outputs a driving signal (FIG. 11C) based on a fundamental signal (FIG. 11A) generated at the fundamental signal generation part 21 and a pulse signal (FIG. 11B) generated at the pulse signal generation part 22. In the course of this operation, the speed of the ultrasonic motor 10 is forced to follow a speed target value Vs set at the target value setting part 26, as will be described below.

(i) Interval Fa→Interval Fb

During an interval Fa, the duty ratio of a pulse signal generated at the pulse signal generation part 22 is set to 100% (which means a driving signal is a fundamental signal without change), and a speed detected at the detection part 25 is larger than the target value Vs.

Accordingly, during an interval Fb, the speed adjustment mentioned above (1) is performed. That is, the adjustment part 27 outputs an adjustment signal that reduces the duty ratio of the pulse signal generated at the pulse signal generation part 22 to be lower than that during the interval Fa and intermittently drives the ultrasonic motor 10, to reduce the speed of the ultrasonic motor 10 to be lower than that during the interval Fa.

(ii) Interval Fb→Interval Fc

During an interval Fb when the ultrasonic motor 10 is intermittently driven, the speed detected at the detection part 25 is still larger than the target value Vs, just like during the interval Fa.

Accordingly, during an interval Fc, the speed adjustment mentioned above (1) is performed again. That is, the adjustment part 27 outputs an adjustment signal that reduces the duty ratio of the pulse signal generated at the pulse signal generation part 22 to be lower than that during the interval Fb, to reduce the speed of the ultrasonic motor 10 to be lower than that during the interval Fb.

(iii) Interval Fc→Interval Fd

During an interval Fc with the reduced speed of the ultrasonic motor 10 from that during the interval Fb, the speed detected at the detection part 25 is smaller than the speed target value Vs.

Accordingly, during an interval Fd, the speed adjustment mentioned above (2) is performed. That is, the adjustment part 27 outputs an adjustment signal that increases the duty ratio of the pulse signal generated at the pulse signal generation part 22 to be higher than that during the interval Fc, to increase the speed of the ultrasonic motor 10 to be higher than that during the interval Fc.

When the detected speed becomes equal to the target value Vs during the interval Fd, the speed adjustment mentioned above (3) is performed. That is, the adjustment part 27 outputs an adjustment signal that maintains the duty ratio of the pulse signal generated at the pulse signal generation part 22, to maintain the current speed of the ultrasonic motor 10.

The driving signal generation unit 2C repeats the above operation, causing the speed (detected speed) of the ultrasonic motor 10 to follow the speed target value set at the target value setting part 26.

Again in the drive apparatus 1C having this configuration, by setting a frequency Tp (FIG. 11C) of the pulse signal generated at the pulse signal generation part 22 to a frequency outside the audible frequency range at the time of intermittently driving the ultrasonic motor 10, harsh sounds can be easily suppressed to lower noise, as in the first preferred embodiment.

The speed adjustment to the ultrasonic motor 10 in the drive apparatus 1C is not required to be made by changing the duty ratio of a pulse signal, but may be made by changing the period of a pulse signal. In such case, the adjustment part 27 outputs the following adjustment signals:

(1) Detected Speed>Target Value:

An adjustment signal is output that extends the period of a pulse signal generated at the pulse signal generation part 22 (extends ON time with respect to fixed OFF time, for example).

(2) Detected Speed<Target Value:

An adjustment signal is output that shortens the period of a pulse signal generated at the pulse signal generation part 22 (shortens ON time with respect to fixed OFF time, for example).

(3) Detected Speed=Target Value:

An adjustment signal is output that maintains the period of a pulse signal generated at the pulse signal generation part 22 (does not change ON time with respect to fixed OFF time, for example).

Fourth Preferred Embodiment

FIG. 12 is a block diagram of the configuration of a principal part of a drive apparatus 1D according to a fourth preferred embodiment of the present invention.

The drive apparatus 1D has a similar configuration to the drive apparatus 1C according to the third preferred embodiment, except a driving signal generation unit.

Namely, a driving signal generation unit 2D of the drive apparatus 1D includes the same elements as the driving signal generation unit 2C according to the third preferred embodiment, and is further provided with a driving voltage adjustment part 28.

The driving voltage adjustment part 28 outputs a voltage signal to the current amplification part 15, the voltage signal being in accordance with deviation between the speed detected at the detection part 25 and the target value at the target value setting part 26. Then, a voltage is applied to the ultrasonic motor 10 based on a voltage value set by this voltage signal, thereby adjusting the speed of the ultrasonic motor 10. Namely, the speed of the ultrasonic motor 10 can be changed by changing a voltage (amplitude of a fundamental signal) serving as a defining factor that defines the periodic waveform of a fundamental signal (periodic signal). The speed adjustment to the ultrasonic motor 10 by the driving voltage adjustment part 28 will be described in detail.

FIGS. 13A to 13E illustrate a speed adjustment to the ultrasonic motor 10 by the driving voltage adjustment part 28. In this speed adjustment, a fundamental signal shown in FIG. 13A without change is used as a driving signal without performing intermittent drive (i.e., the duty ratio of a pulse signal generated at the pulse signal generation part 22 is set to 100% as shown in FIG. 13B). FIG. 13D shows gradually reducing the voltage amplitude of the driving signal based on a voltage signal (FIG. 13C) from the driving voltage adjustment part 28.

By gradually reducing the voltage value of the voltage signal output from the driving voltage adjustment part 28 over intervals Ga to Gd, the voltage amplitude of the driving signal is reduced as shown in FIG. 13D. As a result, the speed of the ultrasonic motor 10 is favorably reduced over the intervals Ga to Gc but becomes unstable at zero during the interval Gd, as shown in FIG. 13E. The reason for this is because the voltage value of the voltage signal becomes smaller than a stable drive limit voltage Vth with which the ultrasonic motor 10 can be driven with stability. Stated another way, low-speed drive corresponding to the stable drive limit voltage Vth or below cannot be performed only by adjusting the voltage amplitude of the driving signal.

Therefore, the drive apparatus 1D according to this embodiment performs control (hereafter called "hybrid control") that combines the voltage adjustment to the driving signal (hereafter called "driving voltage control") and the above-described intermittent drive (hereafter called "intermittent drive control"), to finely adjust the speed of the ultrasonic motor 10. The hybrid control will be described in detail with reference to FIGS. 14A to 14E.

The driving signal generation unit 2D processes a fundamental signal (FIG. 14A) output from the fundamental signal generation part 21 based on a pulse signal (FIG. 14B) generated at the pulse signal generation part 22 and a voltage signal (FIG. 14C) output from the driving voltage adjustment part 28, to output a driving signal (FIG. 14D) for the ultrasonic motor 10.

During intervals Ha to Hd, only the intermittent drive control is performed that changes the duty ratio of the pulse signal generated at the pulse signal generation part 22 while keeping a constant voltage value for the voltage signal, causing the speed of the ultrasonic motor 10 to follow the target value Vs set at the target value setting part 26.

It is desirable for ON time of the pulse signal to be an integral multiple of the period Ta (see FIG. 2A) of the fundamental signal. Accordingly, it is difficult to drive the ultrasonic motor 10 with an intermediate speed other than the integral multiple when reducing the speed of the ultrasonic motor 10 by performing only the intermittent drive control. Namely, since the speed target value Vs is an intermediate speed between a speed of the intermittent drive during the interval Hc and a speed of the intermittent drive during the interval Hd, a speed Vc during the interval Hd closest to the target value Vs is a limit speed that follows the target value Vs. Therefore, an accurate adjustment to the speed target value Vs cannot be made.

In view of this, the intermittent drive control having difficulty with fine speed adjustment is combined with the driving voltage control during the interval He, causing the speed of the ultrasonic motor 10 to follow the target value Vs. That is, during the interval He, the voltage value of the voltage signal is reduced to be lower than that during the interval Hd (yet not less than the stable drive limit voltage Vth) to reduce the amplitude of the driving signal, causing the speed of the ultrasonic motor 10 to follow the speed target value Vs.

Such hybrid control allows the speed of the ultrasonic motor 10 to be finely adjusted from high speed to low speed, as depicted in a graph Vp in FIG. 15A. Namely, the intermittent drive control shown in FIG. 15B (which sets the duty ratio of the pulse signal generated at the pulse signal generation part 22 to 100% during an interval Ja, 75% during an interval Jb, 50% during an interval Jc, and 25% during an interval Jd) only allows a stepped speed adjustment as depicted in a graph Vq in FIG. 15A. By combining the intermittent drive control with the driving voltage control shown in FIG. 15C (which gradually reduces the voltage value of the voltage signal output from the driving voltage adjustment part 28 over the intervals Ja to Jd), the speed can be set linearly, as depicted in the graph Vp in FIG. 15A.

Again in the drive apparatus 1D having this configuration, by setting the frequency Tp (FIG. 11C) of the pulse signal generated at the pulse signal generation part 22 to a frequency outside the audible frequency range at the time of intermittently driving the ultrasonic motor 10, harsh sounds can be easily suppressed to lower noise, as in the first preferred embodiment. In addition, the drive apparatus 1D can finely adjust the speed of the ultrasonic motor 10 by performing the hybrid control combining the intermittent drive control and the driving voltage control.

The hybrid control by the drive apparatus 1D is not required to be performed by combining the intermittent drive control with the driving voltage control, but may be performed by combining the intermittent drive control with the following controls (1) to (3) for changing a defining factor that defines the periodic waveform of a periodic signal.

(1) Control of Frequency of Fundamental Signal

Figure 16:
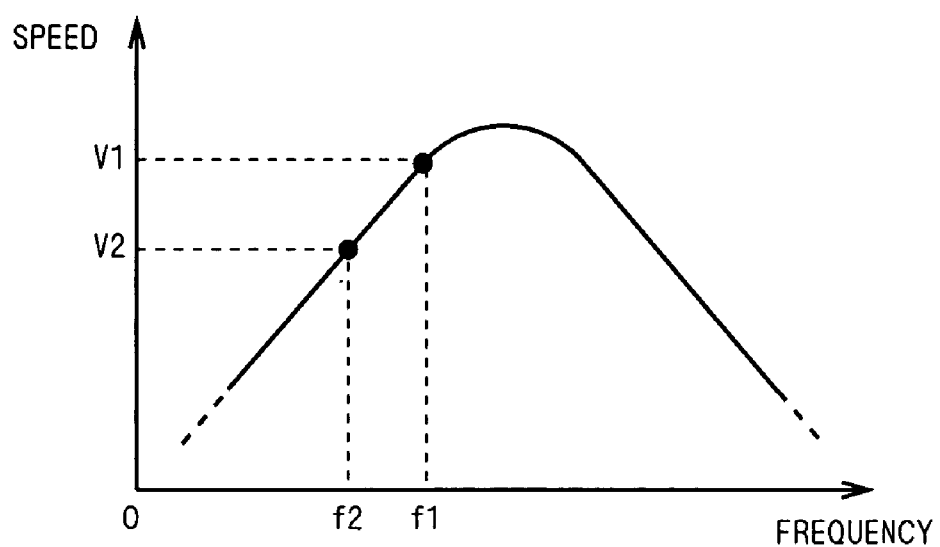
FIG. 16 is a diagram for explaining a speed adjustment to the ultrasonic motor by controlling the frequency of a fundamental signal.

There is a correlation such as shown in FIG. 16 between the frequency of a fundamental signal and the speed of the ultrasonic motor 10. As a frequency f1 of a fundamental signal is reduced to a frequency f2, a speed v1 of the ultrasonic motor 10 is reduced to a speed v2.

Accordingly, by combining frequency control of the fundamental signal (periodic signal) and the intermittent drive control, the speed of the ultrasonic motor 10 can be finely adjusted.

(2) Control of Duty Ratio of Fundamental Signal

Figure 17A:
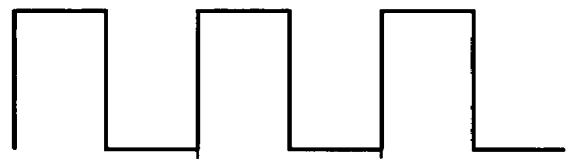
FIGS. 17A and 17B are diagrams for explaining a speed adjustment to the ultrasonic motor by controlling the duty ratio of a fundamental signal.
Figure 17B:
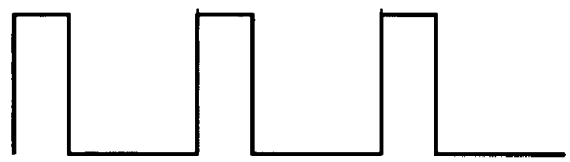

In a fundamental waveform formed as the rectangular wave signal (pulse signal) SGa (FIG. 4), the speed of the ultrasonic motor 10 can be adjusted by changing the duty ratio of the signal. For example, as a rectangular wave signal having a duty ratio of 50% such as shown in FIG. 17A is changed to a rectangular wave signal having a duty ratio of 30% such as shown in FIG. 17B, the speed of the ultrasonic motor 10 is reduced.

Accordingly, by combining control on the duty ratio of the fundamental signal and the intermittent drive control, the speed of the ultrasonic motor 10 can be finely adjusted.

Figure 18:
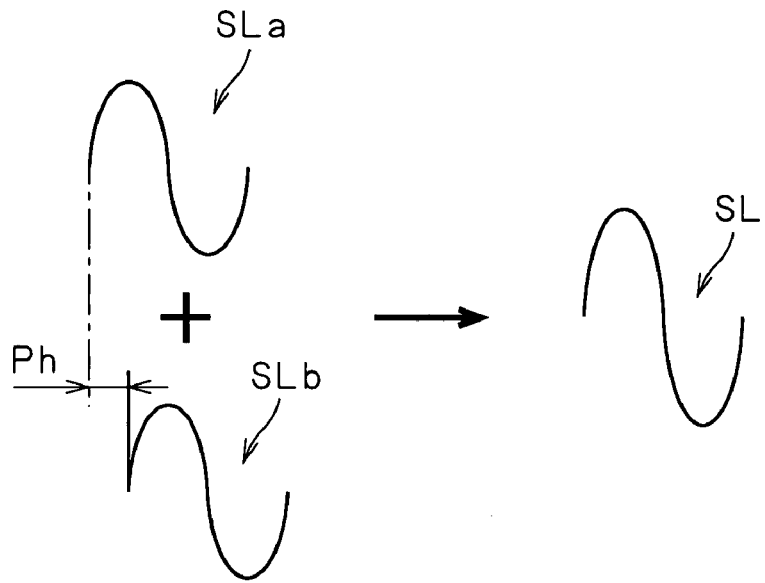
FIG. 18 is a diagram for explaining a speed adjustment to the ultrasonic motor by controlling a phase difference between a plurality of periodic signals of a fundamental signal.

(3) Control of Phase Difference Between a Plurality of Periodic Signals of Fundamental Signal Assume that the fundamental signal generation part 21 generates, as a fundamental signal, an alternating signal SL by combining a plurality of periodic signals SLa and SLb as shown in FIG. 18, the alternating signal SLb being delayed by a phase difference Ph from the alternating signal SLa. Utilizing the amplitude and the like of the alternating signal SL that change with a change in phase difference Ph, the speed of the ultrasonic motor 10 can be adjusted. When a fundamental signal is generated by combining a plurality of pulse signals, the speed of the ultrasonic motor 10 can be adjusted by changing a phase difference between each pulse signal.

Accordingly, by combining control on the phase difference between each of a plurality of periodic signals of the fundamental signal and the intermittent drive control, the speed of the ultrasonic motor 10 can be finely adjusted.

<Variations>

The pulse signal generation part 22 is not required to be provided in the above preferred embodiments. Alternatively, an intermittent signal may be output by outputting and suspending a fundamental signal based on ON time and OFF time controlled inside the switching part 23.

Figure 19:
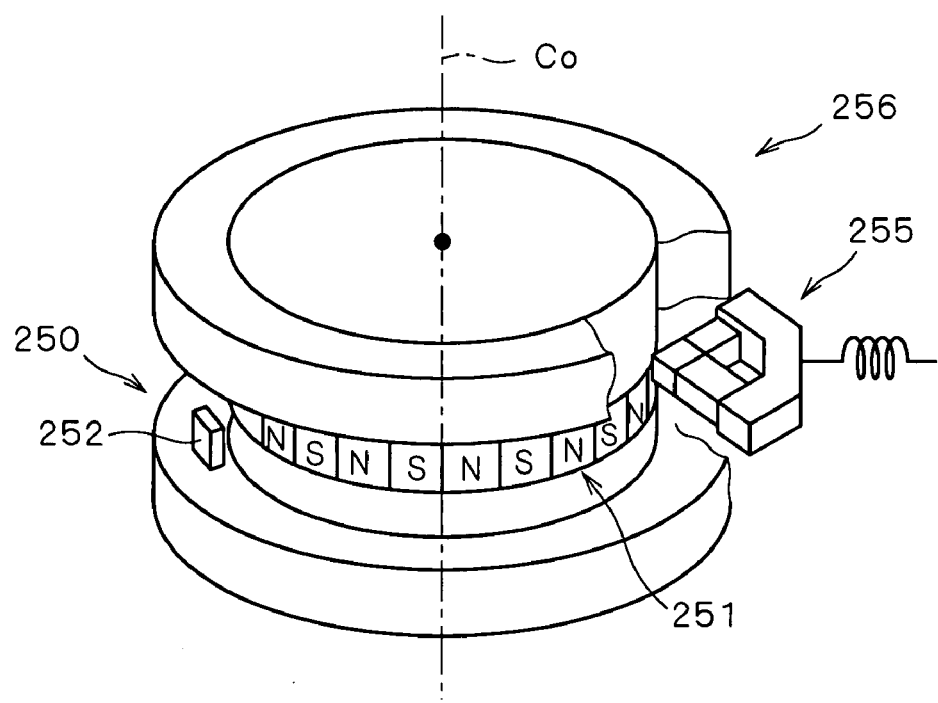
FIG. 19 illustrates a sensor according to a variation of the present invention.

The detection part 25 in the third preferred embodiment is not required to be formed as the optical sensor such as shown in FIG. 10A, but may be formed as a magnetic sensor 250 shown in FIG. 19, or as a detecting element such as a gyro.

The sensor 250 shown in FIG. 19 is provided with a magnetic part 251 which is magnetized to S and N poles alternately around the perimeter of a motor 256 that rotates centering around a rotation axis Co by a piezoelectric element 255. Upon detecting a change in magnetism of the magnetic part 251 that rotates together with the rotation of the motor 256 by a magnetic sensor 252, the sensor 250 detects the speed of the motor 256.

Moreover, the detection part 25 in the third preferred embodiment is not required to output the speed of the ultrasonic motor 10 as a detection signal, but may output an indirect detection signal (such as a position and acceleration) capable of calculating the speed of the ultrasonic motor 10.

While the invention has been shown and described in detail, the foregoing description is in all aspects illustrative and not restrictive. It is therefore understood that numerous modifications and variations can be devised without departing from the scope of the invention.

What is claimed is:

1. A drive apparatus for driving a movable part, said drive apparatus comprising:
   (a) an electromechanical transducer element which is configured to expand and contract upon application of a voltage to drive said movable part;
   (b) an intermittent outputting part which is configured to automatically, in a repeated output cycle, intermittently output a portion of a periodic signal, each of the repeated output cycles including an intermittent driving period during which time the periodic signal is output, and an off period during which time an output of the periodic signal is suspended, the signal output from the repeated output cycles comprising an intermittent signal; and
   (c) an intermittent driving part which is configured to apply a voltage to said electromechanical transducer element based on the intermittent signal output from said intermittent outputting part,
   wherein said intermittent outputting part is configured so as to be capable of adjusting a driving speed of said movable part, and
   wherein said intermittent outputting part is configured so that across an entire range of adjustment of a driving speed of said movable part, a frequency of an output cycle period of said intermittent signal is a frequency outside an audible frequency range across said entire range of adjustment.

2. The drive apparatus according to claim 1, wherein said intermittent outputting part includes
   (b-1) a changing part which is configured to change a ratio of said intermittent driving period to said off period in said output cycle without changing the period of said output cycle, said changing part being configured to thereby change said driving speed of said movable part during driving.

3. The drive apparatus according to claim 1, wherein said intermittent outputting part includes
   (b-2) a changing part which is configured to change a ratio of said intermittent driving period to said off period in said output cycle by changing the period of said output cycle, said changing part being configured to thereby change said driving speed of said movable part during driving.

4. The drive apparatus according to claim 2, further comprising
   (d) a detecting part which is configured to output a detection signal for said driving speed of said movable part,
   wherein said changing part is configured to respond to the detection signal to change said ratio of said intermittent driving period to said off period in said output cycle based on said detection signal.

5. The drive apparatus according to claim 1, wherein said intermittent outputting part includes
   (b-3) a periodic signal changing part which is configured to change a defining factor that defines a periodic waveform of said periodic signal, said periodic signal changing part being configured to thereby change said driving speed of said movable part during driving.

6. The drive apparatus according to claim 5, wherein said defining factor is an amplitude of said periodic signal.

7. The drive apparatus according to claim 5, wherein said defining factor is a frequency of said periodic signal.

8. The drive apparatus according to claim 5, wherein
   said periodic signal is formed as a pulse signal, and
   said defining factor is a duty ratio of said pulse signal.

9. The drive apparatus according to claim 5, wherein
   said intermittent outputting part is configured to generate said periodic signal by combining a plurality of periodic signals, and
   said defining factor is a phase difference between each of said plurality of periodic signals.

10. An apparatus for driving a movable part, said apparatus comprising:
    an electromechanical transducer element which is adapted to expand and contract upon application of a voltage thereto and configured to thereby drive said movable part;
    a first signal generator that is configured to automatically generate a periodic signal;
    a second signal generator that is configured to automatically generate a changeable pulse signal;
    a third signal generator that is configured to receive the periodic signal and the pulse signal and to generate a drive signal based on the periodic signal and the pulse signal; and
    an amplifier that is configured to receive the drive signal and to amplify the driving signal for application to the electromechanical transducer element;
    wherein said third signal generator is configured so that across an entire range of change of a driving speed of said movable part, said third signal generator generates said drive signal comprising a repeated output cycle, each of the repeated output cycles including a driving period during which time a plurality of on and off cycles of the periodic signal are output, and an off period during which time an output of the periodic signal is suspended, a ratio of said driving period to said off period within each output cycle being based on said pulse signal,
    wherein said apparatus is configured to change a driving speed of said movable part by changing a ratio of said driving period to said off period within each output cycle, and
    wherein a frequency of an output cycle period of said drive signal is a frequency outside an audible frequency range across said entire range of change.

11. The apparatus for driving a movable part according to claim 10, wherein said second signal generator is configured to generate a periodic pulse signal having a changeable duty ratio between an on state and an off state.

12. An apparatus for driving a movable part according to claim 11, further comprising a speed setting part that is configured to output a speed signal to the second signal generator to generate a pulse signal having a duty ratio in accordance with the speed signal output from the speed setting part.

13. An apparatus for driving a movable part according to claim 12, wherein said second signal generator is configured to generate a periodic pulse signal having a fixed output cycle period.

14. An apparatus for driving a movable part according to claim 12, wherein said second signal generator is configured to generate a periodic pulse signal having a variable output cycle period including a variable on time and a fixed off time.

15. A method for operating an apparatus for driving a movable part of the type using an electromechanical transducer element which is adapted to expand and contract upon application of a voltage thereto to thereby drive said movable part, said method comprising:

generating a periodic signal;

generating a pulse signal;

combining the periodic signal and the pulse signal with an electronic device so as to automatically generate a drive signal having a repeated output cycle, wherein each of the repeated output cycles includes a driving period during which time a plurality of on and off cycles of the periodic signal are output and an off period during which time an output of the periodic signal is suspended, and wherein a ratio of said driving period to said off period within each output cycle is based on said pulse signal;

amplifying the driving signal and applying the amplified driving signal to the electromechanical transducer element to thereby drive said movable part; and changing said pulse signal so as to change said ratio of said driving period to said off period within each output cycle of said drive signal in order to change a driving speed of said movable part, wherein for an entire range of said ratio of said driving period to said off period within each output cycle of said drive signal, a frequency of an output cycle period of said drive signal is a frequency outside an audible frequency range.

16. The method according to claim 15, further comprising the steps of driving said movable part with said driving signal and changing a driving speed of said movable part by changing a ratio of said driving period to said off period within the output cycle of the drive signal.

17. The method according to claim 16, wherein said ratio of said driving period to said off period within the output cycle of the drive signal is changed by changing said pulse signal.

\* \* \* \* \*